(12) United States Patent
Rofougaran et al.

(10) Patent No.: US 9,071,324 B2
(45) Date of Patent: Jun. 30, 2015

(54) METHOD AND SYSTEM FOR COMMUNICATING UP TO EXTREME HIGH FREQUENCIES USING A MESH NETWORK OF REPEATERS

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 2271 days.

(21) Appl. No.: 11/865,004

(22) Filed: Sep. 30, 2007

(65) Prior Publication Data

US 2009/0088072 A1    Apr. 2, 2009

(51) Int. Cl.
*H04B 7/155* (2006.01)
(52) U.S. Cl.
CPC ........ *H04B 7/15571* (2013.01); *H04B 7/15535* (2013.01); *H04B 7/15564* (2013.01)
(58) Field of Classification Search
None
See application file for complete search history.

(56) References Cited

U.S. PATENT DOCUMENTS

| 6,032,057 A * | 2/2000 | Kiiski ........................... 455/446 |
| 2002/0012336 A1* | 1/2002 | Hughes et al. ................. 370/347 |

* cited by examiner

*Primary Examiner* — Philip Sobutka
(74) *Attorney, Agent, or Firm* — Oblon, McClelland, Maier & Neustadt, L.L.P.

(57) ABSTRACT

A plurality of repeater devices, each of which may enable forwarding extreme high frequency (EHF) communication between EHF-enabled wireless devices, may form a repeater mesh network. One or more routes may be formed within the repeater mesh network to enable forwarding EHF RF signals via the repeater mesh network. Different technique may be utilized, while forming routes within the repeater mesh network, to reduce and/or prevent interference that might be caused by EHF RF signals received and/or transmitted by repeater devices in the routes to other repeater devices in the repeater mesh network. These techniques may comprise frequency shifting, spatial isolation, and/or polarization isolation. Multiple routes may be utilized simultaneously to forward EHF RF communication. The simultaneous use of multiple routes may enable increasing the bandwidth and/or improving reliability of forwarding EHF RF communication within the repeater mesh network.

16 Claims, 4 Drawing Sheets

METHOD AND SYSTEM FOR COMMUNICATING UP TO EXTREME HIGH FREQUENCIES USING A MESH NETWORK OF REPEATERS

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to wireless communication. More specifically, certain embodiments of the invention relate to a method and system for communicating up to extreme high frequencies using a mesh network of repeaters.

BACKGROUND OF THE INVENTION

In 2001, the Federal Communications Commission (FCC) designated a large contiguous block of 7 GHz bandwidth for communications in the 57 GHz to 64 GHz spectrum. This frequency band was designated for use on an unlicensed basis, that is, the spectrum is accessible to anyone, subject to certain basic, technical restrictions such as maximum transmission power and certain coexistence mechanisms. The communications taking place in this band are often referred to as '60 GHz communications.' With respect to accessibility of this designated portion of the spectrum, 60 GHz communications is similar to other forms of unlicensed spectrum use, for example Wireless LANs (WLAN) or Bluetooth in the 2.4 GHz ISM bands. However, communications at 60 GHz may be significantly different in aspects other than accessibility. For example, 60 GHz signals may provide markedly different communications channel and propagation characteristics, at least due to the fact that 60 GHz radiation is partly absorbed by oxygen in the air, leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicating up to extreme high frequencies using a mesh network of repeaters, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for communicating up to extreme high frequencies using a mesh network of repeaters. A plurality of repeater devices, each of which may enable forwarding extreme high frequency (EHF) communication between EHF-enabled wireless devices, may form a repeater mesh network. One or more routes may be formed within the repeater mesh network to enable forwarding EHF RF signals via the repeater mesh network. Different technique may be utilized, while forming routes within the repeater mesh network, to reduce and/or prevent interference that might be caused by EHF RF signals received and/or transmitted by repeater devices in the routes to other repeater devices in the repeater mesh network. These techniques may comprise frequency shifting, spatial isolation, and/or polarization isolation. Multiple routes may be utilized simultaneously to forward EHF RF communication. The simultaneous use of multiple routes may enable increasing the bandwidth and/or improving reliability of forwarding EHF RF communication within the repeater mesh network.

Figure 1:
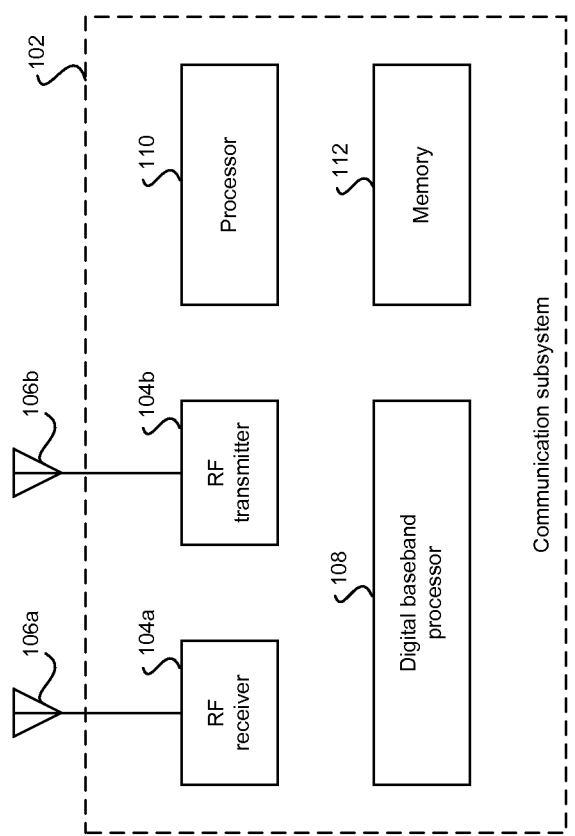
FIG. 1 is a block diagram illustrating an exemplary communication subsystem, which may be utilized in connection with an embodiment of the invention.

FIG. 1 is a block diagram illustrating an exemplary communication subsystem, which may be utilized in accordance with an embodiment of the invention. Referring to FIG. 1, there is shown a communication subsystem 102, an RF receiver 104a, an RF transmitter 104b, a receive antenna 106a, a transmit antenna 106b, a digital baseband processor 108, a processor 110, and a memory 112.

The communication subsystem 102 may comprise the RF receiver 104a, the RF transmitter 104b, the receive antenna 106a, the transmit antenna 106b, the digital baseband processor 108, the processor 110, the memory 112, and may also comprise additional suitable logic, circuitry, and/or code that may enable receiving, transmitting, and processing of RF signals. For example, the communication subsystem 102 may be integrated or located within a wireless device to enable operations in a wireless system, such as the cellular network and/or digital video broadcast network.

The receive antenna 106a may comprise suitable logic, circuitry, and/or code that may enable reception of RF signals; receive antenna 106a may be communicatively coupled to the RF receiver 104a. The RF receiver 104a may comprise suitable logic, circuitry, and/or code that may enable processing of received RF signals. The RF receiver 104a may enable receiving extremely high frequency (EHF) signals at, for example, approximately 60 GHz. In this regard, the RF receiver 104a may be enabled to generate signals, such as local oscillator signals, for the reception and processing of EHF signals. The RF receiver 104a may down-convert received RF signals to a baseband frequency signal. The RF receiver 104a may perform direct down-conversion of the received RF signals to a baseband frequency signal, for example. In some instances, the RF receiver 104a may enable analog-to-digital conversion of the baseband signal components before transferring the components to the digital baseband processor 108. In other instances, the RF receiver 104a may transfer the baseband signal components in analog form. The receive antenna 106a and the RF receiver 104a may also enable reception of non-EHF RF signals. For example, the receive antenna 106a and the RF receiver 104a may enable receiving and/or processing of Bluetooth RF signals.

The transmit antenna 106b may comprise suitable logic, circuitry, and/or code that may enable transmission of RF signals; the transmit antenna 106b may be communicatively coupled to the RF transmitter 104b. The RF transmitter 104b may comprise suitable logic, circuitry, and/or code that may enable processing of RF signals for transmission. The RF transmitter 104b may enable transmission of extremely high frequency (EHF) signals at, for example, approximately 60 GHz. In this regard, the RF transmitter 104b may be enabled to generate signals, such as local oscillator signals, for the transmission and processing of EHF signals. The RF transmitter 104b may up-convert the baseband frequency signal to an RF signals. The RF transmitter 104b may perform direct up-conversion of the baseband frequency signal to a RF signals of approximately 60 GHz, for example. In some instances, the RF transmitter 104b may enable digital-to-analog conversion of the baseband signal components received from the digital baseband processor 108 before up conversion. In other instances, the RF transmitter 104b may receive baseband signal components in analog form. The transmit antenna 106b and the RF transmitter 104b may also enable transmission of non-EHF RF signals. For example, the transmit antenna 106b and the RF transmitter 104b may enable transmitting and/or processing of Bluetooth RF signals.

The digital baseband processor 108 may comprise suitable logic, circuitry, and/or code that may enable processing and/or handling of baseband frequency signals. In this regard, the digital baseband processor 108 may process or handle signals received from the RF receiver 104a and/or signals to be transferred to the RF transmitter 104b. The digital baseband processor 108 may also provide control and/or feedback information to the RF receiver 104a and to the RF transmitter 104b based on information from the processed signals. The digital baseband processor 108 may communicate information and/or data from the processed signals to the processor 110 and/or to the memory 112. Moreover, the digital baseband processor 108 may receive information from the processor 110 and/or to the memory 112, which may be processed and transferred to the RF transmitter 104b for transmission to the network.

The processor 110 may comprise suitable logic, circuitry, and/or code that may enable control and/or data processing operations for the communication subsystem 102. The processor 110 may be utilized to control at least a portion of the RF receiver 104a, the RF transmitter 104b, the digital baseband processor 108, and/or the memory 112. In this regard, the processor 110 may generate at least one signal for controlling operations within the communication subsystem 102. The processor 110 may also enable executing of applications that may be utilized by the communication subsystem 102. For example, the processor 110 may execute applications that may enable displaying and/or interacting with content received via RF signals in the communication subsystem 102.

The memory 112 may comprise suitable logic, circuitry, and/or code that may enable storage of data and/or other information utilized by the communication subsystem 102. For example, the memory 112 may be utilized for storing processed data generated by the digital baseband processor 108 and/or the processor 110. The memory 112 may also be utilized to store information, such as configuration information, that may be utilized to control the operation of at least one block in the communication subsystem 102. For example, the memory 112 may comprise information necessary to configure the RF receiver 104a to enable receiving signals in the appropriate frequency band.

In operation, the communication subsystem 102 may enable communication via RF interfaces. The communication subsystem 102 may be integrated within a wireless devices to enable communication via an EHF interface, for example the 60 GHz band. For example, the communication subsystem 102 may receive RF signals operating in the 60 GHz band via the receive antenna 106a; wherein the RF receiver 104a may enable initial processing of the received signal. The communication subsystem 102 may transmit RF signals operating in the 60 GHz band via the RF transmitter 104b and the transmit antenna 106b. The digital baseband processor 108, the processor 110, and the memory 112 may enable performing control and/or related operation during transmission and/or reception of RF signals. For example, the memory 112 may be utilized to store and/or fetch data that may be received and/or transmitted via 60 GHz RF signals. The digital 108 may enable performing signal processing operation such as analog-to-digital conversion, encoding/decoding of received and/or transmitted data via the 60 GHz RF signals. The processor 110 may enable controlling of the operations of the communication subsystem 102. For example, the processor 110 may enable operating of the transmit and/or the receive antennas to enable aligning during 60 GHz RF communications.

In addition to EHF communications, which may have limited operational range compared with lower frequency RF interfaces, the communication subsystem 102 may be enabled to utilize other wireless interfaces and/or protocols. For example, the communication subsystem 102 may be enabled to utilize such wireless interfaces as Bluetooth to perform Bluetooth RF communications. Accordingly, the receive antenna 106a, the RF receiver 104a, and/or other components within the communication subsystem 102 may enable reception of non-EHF RF signals, for example, Bluetooth RF signals. Similarly, the transmit antenna 106b, the RF transmitter 104b, and/or other components within the communication subsystem 102 may enable transmission of non-EHF RF signals, for example, Bluetooth RF signals. The non-EHF interfaces that may be supported in the communication subsystem 102 may be utilized to send information regarding the communication subsystem 102. For example, a Bluetooth connection may be utilized to send information regarding the capability of the communication subsystem 102 and/or to receive messages containing information regarding preferred setting that may be utilized while performing EHF communication.

In an embodiment of the invention, repeater devices may be utilized to extend the range of EHF communication between wireless devices that may comprise the communication system 100. EHF communication may generally have limited range, typically operating only in "line-of-sight" settings. Consequently, it may be desirable to utilize other devices, for example, repeater devices, to extend the range of communication between EHF-enabled devices. However, since such repeater devices would be receiving and transmitting EHF RF signals, the repeater devices may be limited by the operational limitations of EHF communication. Consequently, utilizing a single repeater device may not yield substantial increase in the range of EHF RF communication. Alternatively, a group of repeater devices, forwarding EHF RF signal in chain-like configuration, may enable substantial increase in EHF RF communication.

Figure 2:
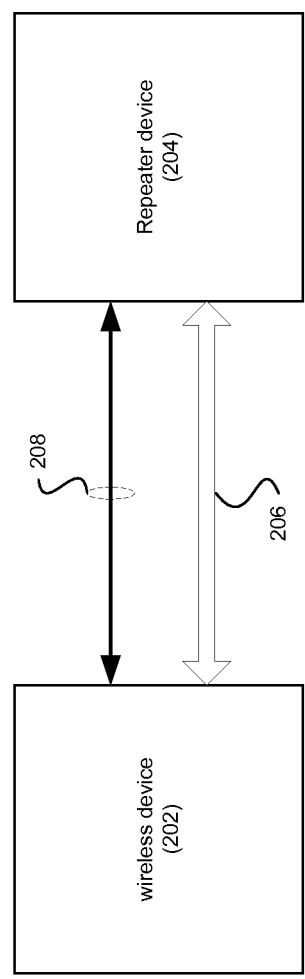
FIG. 2 is a block diagram illustrating a repeater device utilized to forward EHF RF communication between two wireless devices, which may be utilized in accordance with an embodiment of the invention.

FIG. 2 is a block diagram illustrating a repeater device utilized to forward 60 GHz communication between two wireless devices, which may be utilized in accordance with an embodiment of the invention. Referring to FIG. 2, there is shown a wireless device 202, a repeater device 204, an EHF connection 206, and a control connection 208.

The wireless device 202 may each comprise suitable logic, circuitry, and/or code that may enable receiving, transmitting, and processing of RF signals. For example, the wireless device 202 may comprise the communication subsystem 102, substantially as described in FIG. 1.

The repeater device 204 may comprise suitable logic, circuitry, and/or code that may enable reception and/or transmission of EHF signals to facilitate forwarding EHF signals transmitted by the wireless device 202. Additionally, the repeater device 204 may comprise suitable logic, circuitry, and/or code that may enable establishing and/or utilizing control connection 208 with the wireless device 202.

The EHF connection 206 may comprise a radio (RF) and/or wireless link that may be based on an EHF protocol that may comprise the 60 GHz interface. The control connection 208 may comprise a radio (RF) and/or wireless link that may be based on a non-EHF protocol that may comprise Bluetooth, ZigBee, and/or WiFi. The control connection 208 may be utilized to communicate control messages, for example, between the wireless device 202 and the repeater device 204.

In operation, the repeater device 204 may enable forwarding EHF RF signals transmitted and/or received by the wireless device 202 via the EHF connection 206. EHF communication may generally have limited range, typically operating only in "line-of-sight" settings. Consequently, it may be desirable to utilize other devices, for example, repeater devices such as the repeater device 204, to extend the range of communication between EHF-enabled devices.

The wireless device 202 may utilize the communication subsystem 102 to enable transmission and/or reception of EHF RF signals via the EHF connection 206. The repeater device 204 may be utilized because EHF RF signals may have limited operational range. The wireless device 202, and/or the repeater device 204 may utilize the control connection 208 during EHF communication between devices. The control connections 208 may enable exchanging control messages, data, and/or information that may enable facilitating EHF communication via the EHF connection 206. For example, the control connection 208 may enable the wireless device 202 to determine whether the repeater device 204 may be utilized to forward EHF RF signal transmitted by wireless device 202. Alternatively, the repeater device 204 may utilize the control connection 206 to notify the wireless device 202 of an impending EHF communication targeted for the wireless device 202.

While it may be desirable to utilize the repeater device 204 in forwarding EHF RF signals transmitted and/or receive by the wireless device 202, an operational effectiveness of the repeater device 204 may be limited by the operational limitations of EHF communication since the main purpose for utilizing the repeater device 204 may be receiving and transmitting EHF RF signals. Consequently, it may be desirable to utilize a plurality of repeater devices, similar to the repeater device 204, which may be enabled, in their totality, to provided substantial increase of the EHF communication range of the wireless device 202.

Figure 3:
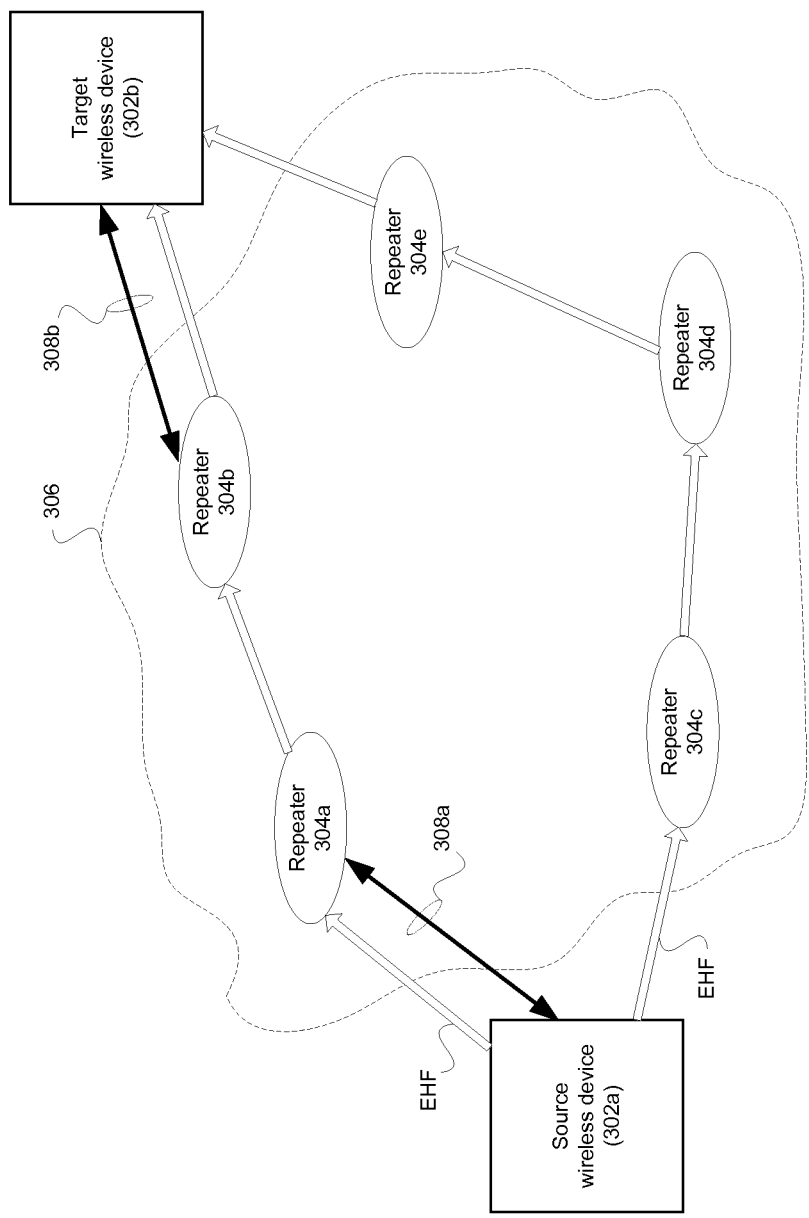
FIG. 3 is a block diagram illustrating a mesh of repeaters that enable forwarding EHF RF communication between two wireless devices, which may be utilized in accordance with an embodiment of the invention.

FIG. 3 is a block diagram illustrating a mesh of repeaters that enable forwarding EHF RF communication between two wireless devices, which may be utilized in accordance with an embodiment of the invention. Referring to FIG. 3, there is shown a source wireless device 302a, a target wireless device 302b, a plurality of repeater devices 304a, 304b, 304c, 304d, and 304e, a repeater mesh network 306, and control connections 308a and 308b.

The source wireless device 302a and the target wireless device 302b may each comprise suitable logic, circuitry, and/or code that may enable receiving, transmitting, and processing of RF signals. For example, the source wireless device 302a and the target wireless device 302b may each be comprised substantially similar to the wireless device 202, as described in FIG. 2.

Each of the plurality of repeater devices 304a, 304b, 304c, 304d, and 304e may comprise suitable logic, circuitry, and/or code that may enable reception and/or transmission of EHF signals to facilitate forwarding EHF RF signals between EHF-enabled devices. For example, each of the plurality of repeater devices 304a, 304b, 304c, 304d, and 304e may be comprised substantially similar to the repeater device 204, as described in FIG. 2.

The repeater mesh network 306 may comprise the plurality of repeater devices 304a, 304b, 304c, 304d, and 304e, and may also comprise suitable logic, circuitry and/or code that may enable forming mesh-like, ad hoc networks of repeater devices.

The control connections 308a and 308b may each be comprised substantially similar to the control connection 208, as described in FIG. 2.

In operations, the plurality of repeater devices 304a, 304b, 304c, 304d, and 304e may form the repeater mesh network 306. Each of the plurality of repeater devices 304a, 304b, 304c, 304d, and 304e may be enabled to ascertain presence of other repeater devices in its vicinity. The repeater devices 304a, 304b, 304c, 304d, and 304e may exchange information that may enable them to determine routing paths within the mesh network 306 while transmitting and/or receiving EHF RF signals. Consequently, the repeater mesh network 306 may enable forwarding EHF RF communication between the source wireless device 302a and the target wireless device 302b.

Because EHF communication may generally have limited range, typically operating only under "line-of-sight" conditions, the source wireless device 302a and the target wireless device 302b may not be able to utilize EHF RF communication directly. A single repeater device, such as the repeater device 204 for example, may be utilized adequately to forward EFH RF communication between the source wireless device 302a and the target wireless device 302b. However, the repeater device 204 may be limited by the operational limitations of EHF communication while receiving and transmitting EHF RF signals. Therefore, where the separation between the source wireless device 302a and the target wireless device 302b may exceed the effective operational range of the repeater device 204, use of single repeater device may not be sufficient. Consequently, the plurality of repeater devices 304a, 304b, 304c, 304d, and 304e may be utilized to enable EHF RF communication between the source wireless device 302a and the target wireless device 302b at distances that may exceed the operational range of a single repeater device. For example, the source wireless device 302a may be enabled to communicate EHF RF signals to the target wireless device 302b via the repeater mesh network 306, utilizing a route that may comprise the repeater devices 304a and 304b.

In an embodiment of the invention, multiple routes may be utilized in a repeater mesh network simultaneously. For example, where the source wireless device 302a may utilize the repeater mesh network 306 to communicate EHF RF signals to the target wireless device 302b, two routes may be utilized to perform the EHF RF communication via the repeater mesh network 306; a first route may comprise the repeater devices 304a and 304b, and a second route may comprise the repeater devices 304c, 304d, and 304e. Information transmitted via the EHF RF communication between the source wireless device 302a and the target wireless device 302b may be multiplexed onto the multiple routes to enable increasing bandwidth compared to what may have been available by use of a single route. Alternatively, the different routes may be utilized to achieve redundancy, to improve a reliability of EHF RF communication between the source wireless device 302a and the target wireless device 302b; wherein each of the multiple routes may be utilized to perform the same EHF RF communication.

To improve the effectiveness of the repeater mesh network 306, different technique may be utilized, while forming routes within the repeater mesh network 306, to reduce and/or prevent interference that might be caused by EHF RF signals received and/or transmitted by a repeater device to the other repeater devices in the repeater mesh network 306. These techniques may comprise frequency shifting, spatial isolation, and/or polarization isolation. For example, each of the plurality of repeater devices 304a, 304b, 304c, 304d, and 304e may be enabled to utilize frequency shifting to vary characteristics of transmitted EHF RF signals to reduce and/or prevent interference to repeater devices not within a determined route. Additionally, use of beam forming may enable spatial isolation that may reduce and/or prevent interference to repeater devices not within a determined route. Finally, proper polarization setting may be selected to enable transmission of EHF RF signals, by each of the plurality of repeater devices 304a, 304b, 304c, 304d, and 304e, that may reduce and/or prevent interference to repeater devices not within a determined route.

The control connections 308a and/or 308b may be utilized to enable the source wireless device 302a and/or the target wireless device 302b to utilize the repeater mesh network 306 to forward EHF RF communication. For example, the source wireless device 302a may utilize control connection 308a to determine, via the repeater device 304a, availability of one or more routes that may enable transmitting EHF RF signals to the target wireless device 302b. Also, the repeater device 304b may utilize the control connection 308b, to coordinate with the target 302b in setting up for EHF RF communication by the source wireless device 302a.

While FIG. 3 only depict a single pair of wireless devices, 302a and 302b, utilizing the repeater mesh network 306, the invention need not be limited to such scenario. The repeater mesh network 306 may be enabled to perform concurrent EHF RF communication forwarding operations, between multiple pairs of wireless devices, at the same time. Additionally, each of the plurality of the wireless devices 304a, 304b, 304c, 304d, and 304e, may be utilized to perform concurrent EHF RF communication forwarding operations for different pairs of wireless devices.

Figure 4:
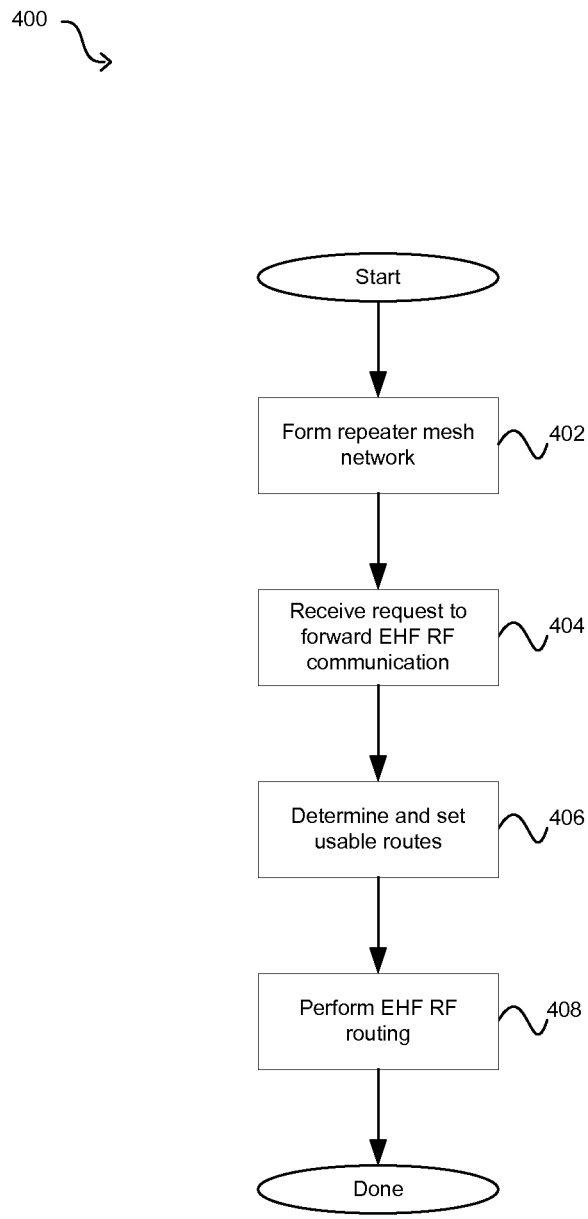
FIG. 4 is an exemplary flow diagram illustrating use of a mesh of repeater to forward EHF RF communications between wireless devices, in accordance with an embodiment of the invention.

FIG. 4 is an exemplary flow diagram illustrating use of a mesh of repeater to forward EHF RF communications between wireless devices, in accordance with an embodiment of the invention. Referring to FIG. 4, there is shown a flow chart 400 comprising a plurality of exemplary steps.

In step 402, the repeater mesh network 306 may be formed. Each of the plurality of repeater devices 304a, 304b, 304c, 304d, and 304e may be enabled to ascertain presence of other repeater devices in its vicinity. Accordingly, the plurality of repeater devices 304a, 304b, 304c, 304d, and 304e may communicate to enable forming the repeater mesh network 306, which may enable forwarding EHF RF communication between EHF-enabled wireless devices. In step 404, a request to forward EHF RF communication via the repeater mesh network 306 may be received. An EHF-enabled wireless device, which may be located in the vicinity of a repeater device in the repeater mesh network 306, may attempt to forward EHF RF signals via the repeater mesh network 306. For example, the source wireless device 302a may utilize control connection 308a to determine, via the repeater device 304a, availability of one or more routes that may enable transmitting EHF RF signals to the target wireless device 302b.

In step 406, routing paths for forwarding EHF RF communication via repeater mesh network 306, may be determined and/or set. For example, upon receiving a request from the source wireless device 302a, via the control connection 308a, to forward EHF RF communication to the target wireless device 302b, one or more routes may be determined that may enable forwarding the EHF RF communication via the repeater mesh network 306. A route may be determined, which may comprise the repeater devices 302a and 302b. Additionally, different technique may be utilized, while forming routes within the repeater mesh network 306, to reduce and/or prevent interference that might be caused by EHF RF signals received and/or transmitted by repeater devices in the routes to other repeater devices in the repeater mesh network 306. These techniques may comprise frequency shifting, spatial isolation, and/or polarization isolation; substantially as described in FIG. 3. In an embodiment of the invention, multiple routes may be formed within the repeater mesh network 306, which may be utilized simultaneously while forwarding EHF RF communication between the source wireless device 302a and the target wireless device 302b, to increase bandwidth and/or improve reliability; substantially as described in FIG. 3. In step 408, the routes formed in step 406 may be utilized to forward EHF RF communication through the repeater mesh network 306.

Various embodiments of the invention may comprise a method and system for communicating up to extreme high frequencies using a mesh network of repeaters. The plurality of repeater devices 304a, 304b, 304c, 304d, and 304e, each of which may enable forwarding extreme high frequency (EHF) communication between EHF-enabled wireless devices, may form the repeater mesh network 306. One or more routes may be formed within the repeater mesh network 306 to enable forwarding EHF RF signals via the repeater mesh network 306. Different technique may be utilized, while forming routes within the repeater mesh network 306, to reduce and/or prevent interference that might be caused by EHF RF signals received and/or transmitted by repeater devices in the routes to other repeater devices in the repeater mesh network 306. These techniques may comprise frequency shifting, spatial isolation, and/or polarization isolation. Multiple routes may be utilized simultaneously to forward an EHF RF communication. The simultaneous use of multiple routes may enable increasing the bandwidth and/or improving reliability of forwarding EHF RF communication within the repeater mesh network 306.

In an embodiment of the invention, a first repeater device, for example the repeater device 304a, may be enabled to forward extremely high frequency (EHF) signals from a first wireless device, for example the source wireless device 302a, to a second wireless device, for example the target wireless device 302b; from the source wireless device 302a to a second repeater device, for example the repeater device 304b; from the repeater device 304b to the source wireless device 302a; or from the repeater device 304b to a third repeater, for example the repeater device 304c, to extend a range of extremely high frequency (EHF) communication. One or more routes may be formed among the repeater device 304a, the repeater device 304b, and/or the repeater device 302c to enable forwarding EHF RF signals between the wireless devices 302a and 302b. Different isolation technique may be utilized, in the repeater device 304a, the repeater device 304b, and/or the repeater device 302c, while forming routes to reduce and/or prevent interference that might be caused by EHF RF signals received and/or transmitted by each of the repeater devices in the routes. These techniques may comprise frequency shifting, spatial isolation, and/or polarization isolation. Multiple routes may be utilized simultaneously to forward an EHF RF communication. The simultaneous use of multiple routes may enable increasing the bandwidth and/or improving reliability while forwarding EHF RF communication between the wireless devices 302a and 302b.

Another embodiment of the invention may provide a machine-readable storage, having stored thereon, a computer program having at least one code section executable by a machine, thereby causing the machine to perform the steps as described herein for communicating up to extreme high frequencies using a mesh network of repeaters.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for improving wireless communication, the method comprising:
   enabling a first repeater device to forward extremely high frequency (EHF) signals from a first wireless device to a second wireless device, from the first wireless device to a second repeater device, from the second repeater device to the first wireless device or from the second repeater device to a third repeater device, to extend a range of EHF communication;
   forming routes within one or more of the first repeater device and the second repeater device, by utilizing one or more isolation techniques, to enable the forwarding of the EHF signals; and
   configuring said forwarding of said EHF signals by utilizing one or more control connections, wherein
   at least one of said one or more control connections is established using a non-extremely high frequency (non-EHF) interface.

2. The method according to claim 1, wherein the EHF signals comprise 60 GHz signals.

3. The method according to claim 1, wherein said one or more isolation techniques comprise spatial isolation, polarization isolation, and/or use of different frequencies in one or more of said first repeater device and said second repeater device.

4. The method according to claim 1, comprising simultaneously utilizing a plurality of said routes while forwarding the EHF signals between two or more of said first wireless device, said second wireless device, said first repeater device, and said second repeater device.

5. The method according to claim 4, comprising increasing a bandwidth of data transmitted via said EHF signals via said simultaneous utilization of said plurality of routes.

6. The method according to claim 4, comprising enabling redundant transmission of said EHF signals by each of said plurality of routes via said simultaneous utilization of the plurality of routes.

7. A method for improving wireless communication, the method comprising:
   enabling a first repeater device to forward extremely high frequency (EHF) signals from a first wireless device to a second wireless device, from the first wireless device to a second repeater device, from the second repeater device to the first wireless device or from the second repeater device to a third repeater device, to extend a range of EHF communication;
   forming routes within one or more of the first repeater device and the second repeater device to enable the forwarding of the EHF signals;
   configuring said forwarding of said EHF signals by utilizing one or more control connections;
   simultaneously utilizing a plurality of said routes while forwarding the EHF signals between two or more of said first wireless device, said second wireless device, said first repeater device, and said second repeater device; and
   enabling redundant transmission of said EHF signals by each of said plurality of routes via said simultaneous utilization of the plurality of routes, wherein
   at least one of said one or more control connections is established using a non-extremely high frequency (non-EHF) interface.

8. The method according to claim 7, wherein the EHF signals comprise 60 GHz signals.

9. The method according to claim 7, wherein said one or more isolation techniques comprise spatial isolation, polarization isolation, and/or use of different frequencies in one or more of said first repeater device and said second repeater device.

10. The method according to claim 7, comprising increasing a bandwidth of data transmitted via said EHF signals via said simultaneous utilization of said plurality of routes.

11. A system for wireless communication, the system comprising:
one or more circuits in a first repeater device that enable the first repeater device to
forward extremely high frequency (EHF) signals from a first wireless device to a second wireless device, from the first wireless device to a second repeater device, from the second repeater device to the first wireless device or from the second repeater device to a third repeater device, to extend a range of EHF communication;
form routes within one or more of the first repeater device and the second repeater device, by utilizing one or more isolation techniques, to enable the forwarding of the EHF signals; and
utilize one or more control connections, wherein at least one of said one or more control connections is established using a non-extremely high frequency (non-EHF) interface.

12. The system according to claim 11, wherein the EHF signals comprise 60 GHz signals.

13. The system according to claim 11, wherein said one or more isolation techniques comprise spatial isolation, polarization isolation, and/or use of different frequencies in one or more of said first repeater device and said second repeater device.

14. The system according to claim 11 wherein said one or more circuits simultaneously utilize a plurality of said routes while forwarding the EHF signals between two or more of said first wireless device, said second wireless device, said first repeater device, and said second repeater device.

15. The system according to claim 14, wherein said one or more circuits increases a bandwidth of data transmitted via said EHF signals via said simultaneous utilization of said plurality of routes.

16. The system according to claim 14, wherein said one or more circuits enables redundant transmission of said EHF signals by each of said plurality of routes via said simultaneous utilization of the plurality of routes.

* * * * *